United States Patent [19]

Battice

[11] Patent Number: 4,477,601

[45] Date of Patent: Oct. 16, 1984

[54] HIGH RESILIENCY MOLDED URETHANE FOAMS CONTAINING HIGH LEVELS OF GRAFT COPOLYMER POLYOLS

[75] Inventor: David R. Battice, Midland, Mich.

[73] Assignee: Dow Corning Corporation, Midland, Mich.

[21] Appl. No.: 552,525

[22] Filed: Nov. 16, 1983

[51] Int. Cl.³ ............................................. C08G 18/14
[52] U.S. Cl. .................... 521/111; 252/182; 521/112; 525/477
[58] Field of Search ................ 521/111, 112; 252/182; 525/477

[56] References Cited

U.S. PATENT DOCUMENTS

| | | | |
|---|---|---|---|
| 3,398,104 | 8/1968 | Haluska | 260/2.5 |
| 3,402,192 | 9/1968 | Haluska | 260/448.2 |
| 4,031,044 | 6/1977 | Joslyn | 260/2.5 |
| 4,139,503 | 2/1979 | Kollmeier et al. | 521/112 |
| 4,147,847 | 4/1979 | Schweiger | 521/112 |
| 4,347,330 | 8/1982 | Demou et al. | 521/110 |

Primary Examiner—Maurice J. Welsh
Attorney, Agent, or Firm—J. E. Bittell

[57] ABSTRACT

A polyether based polyurethane foam is disclosed which contains high levels of reinforcing graft copolymer polyols. The graft copolymer polyol serves to open cells and to add firmness to the foam. This foam is stabilized by incorporating a blend consisting essentially of 3 to 22 weight percent of a surfactant designed for conventional urethane foams, with 78 to 97 weight percent of a surfactant designed for molded high resiliency urethane foams. The surfactants are of the polysiloxane-polyoxyalkylene copolymer type. The method of preparing this foam is also disclosed.

14 Claims, No Drawings

HIGH RESILIENCY MOLDED URETHANE FOAMS CONTAINING HIGH LEVELS OF GRAFT COPOLYMER POLYOLS

FIELD OF THE INVENTION

This invention relates to high resiliency polyurethane foam. More specifically this invention relates to a novel blend of two diverse types of silicone surfactants. The blend of surfactants is especially useful in stabilizing high resiliency foam formulations containing a high content of graft copolymer polyols which are prepared by polymerizing other monomers within polyether polyol solutions.

DESCRIPTION OF THE PRIOR ART

Certain copolymers of alkylene oxides and polysiloxanes in which the polysiloxane blocks and the alkylene oxide blocks are tied together through SiOC linkages are known in the art to be useful as surfactants in the control of polyurethane foams. It is also known that certain copolymers of alkylene oxides and polysiloxanes in which the polymer blocks are tied together through silicon carbon bonds are useful as surfactants in the control of polyurethane foams. The latter materials have a distinct advantage over the former since they are nonhydrolyzable and hence are stable to deterioration by water or other materials containing reactive hydroxyls. This means the latter type of surfactant can be stored under moist conditions or stored admixed with the polyethers prior to foaming. U.S. Pat. Nos. 3,402,192, 3,398,104, and 4,147,847 disclose a class of polysiloxane-polyoxyalkylene branch copolymers which are stable nonhydrolyzable surfactants for conventional polyurethane foams. These surfactants do not give the undesirable pneumatic effect in the foam and thus eliminate the additional costly step of mechanically crushing the foam so as to rupture the closed cells.

Substantial expansion of technology in polyether based polyurethane foam systems has occurred over the last 10-15 years, resulting in, among other events, the creation of a specialized area of high resilience foams, within that industry.

Resilience is defined as the work which a body can do in springing back after a deforming force has been removed. In defining resilience in polyurethane foam, the industry generally considers a sag factor to differentiate conventional foams from high resilience foams. The sag factor is the ratio of indent load deflection at 65 percent deflection to that of the indent load deflection at 25 percent deflection. Indent load deflection is measured in lbs./50 in$^2$. Conventional foams have a sag factor of approximately 2.0 to 2.5 while high resilience foams have such a factor of approximately 2.5 to 3.5.

High resilience foams have found widespread application in the automobile industry for molded parts, and in the furniture and bedding industries. Most production techniques from the already established conventional polyurethane foam industry can be utilized in high resilience foams. High resilience foams are preferred where increased comfort, fatigue resistance, and flame resistance are desired.

The foam stabilizers used in the conventional polyurethane foam systems, however, cannot be employed in the high resilience foams. When conventional polyurethane foam stabilizers are employed in high resilience foams, severe splits and voids in the foam occur along with severe shrinkage of the foam slab.

U.S. Pat. No. 4,031,044 discloses another class of polysiloxane-polyoxyalkylene copolymers which will stabilize many high resilience foams without causing voids, splits, and foam shrinkage while maintaining other valuable properties.

Recently, it has become desirable to manufacture high resiliency polyurethane foam with increased firmness. Increased firmness is desired so that thinner foam sections can be manufactured with load bearing properties equal to thicker sections of currently manufactured foams. Such improved foams are especially desirable in the automotive seat market where reduced size and weight are important considerations in the design of new smaller automobiles. One way to achieve greater firmness in high resiliency foams, is to increase the proportion of graft copolymer polyols in the urethane formulation. These polyols which are made either by polymerization of ethylenically unsaturated monomers in polyether polyols or by reacting diisocyanates with polyamines or hydrazines in polyether polyol solutions, serve to reinforce the foam and add firmness to it.

However, neither of the above-mentioned classes of polysiloxane-polyoxyalkylene surfactants will effectively stabilize molded high resiliency polyurethane foams made from formulations containing the high levels of graft copolymer polyols that are necessary for the firmer foams.

It is thus an object of the present invention to provide a composition and a process for producing and effectively stabilizing high resilience polyurethane foam. It is a further object of the present invention to provide a silicone surfactant that will effectively stabilize high resiliency foam formulations that contain a broad range of proportions of graft copolymer polyol. It is a further object of the present invention to provide a thinner foam with load bearing properties equal to those of thicker foams.

SUMMARY OF THE INVENTION

This invention relates to a composition consisting essentially of (A) 100 parts by weight of a base polyether polyol selected from the group consisting of
  1. a polyether triol containing at least 40 mole percent of primary hydroxyl groups and having a molecular weight in the range of 2,000 to 8,000 grams per mole,
  2. a graft copolymer polyol, and
  3. mixtures thereof;
(B) a sufficient amount of organic polyisocyanate to give from 90 to 120 percent, on a stoichiometric basis, of isocyanate radicals for each hydroxyl radical in the composition;
(C) a catalytic amount of a catalyst for the production of the polyurethane foam;
(D) 1 to 10 parts by weight of a blowing agent;
(E) a foam stabilizing amount of a blend of polysiloxane-polyoxyalkylene copolymers consisting essentially of
  1. 78 to 97 percent by weight of a polydimethylsiloxane-polyoxyalkylene copolymer wherein the polysiloxane contains no more than ten silicon atoms and the polysiloxane has at least one polyoxyalkylene substituent having the general formula selected from the group consisting of —D(OR")$_m$A and —L—D(OR")$_m$A wherein L is an oxygen or a sulfur atom bonded to a carbon atom of the D radical;

D is a divalent linking radical, containing no more than 8 carbon atoms, selected from the group of consisting of
  (a) alkylene radicals,
  (b) radicals composed of carbon, hydrogen, and oxygen atoms, the oxygen atoms being present as ether, ester, or hydroxy groups, and
  (c) radicals composed of carbon, hydrogen, and sulfur atoms, the sulfur atoms being present as thioether, thioester, or thiol groups;

R" is composed of propylene radicals and radicals selected from the group consisting of ethylene and butylene radicals wherein the amount of ethylene and butylene radicals is 0 to 35 weight percent of the total (OR") radical;

m has an average value of 1 to 15;

A is a radical selected from the group consisting of the —OR', OOCR', and $$-\underset{\underset{O}{\|}}{O}COR'$$

radicals wherein R' is a radical free of aliphatic unsaturation selected from the group consisting of hydrocarbons and hydrocarboxy radicals, the A radical containing a total of less than eleven carbon atoms; and 2. 3 to 22 percent by weight of a polydimethylsiloxane-polyoxyalkylene copolymer, said copolymer containing at least 13 percent by weight of dimethylsiloxane units based on the weight of the copolymer, wherein the polysiloxane has at least three polyoxyalkylene substituents having the general formula —D'(OR''')$_k$A and —L—D'(OR''')$_k$A wherein L is an oxygen or sulfur atom bonded to a carbon atoms of the D' radical;

D' is a divalent linking radical containing from 1 to 30 carbon atoms selected from the group consisting of
  (a) alkylene radicals,
  (b) radicals composed of carbon, hydrogen, and oxygen atoms, the oxygen atoms being present as ether, ester, or hydroxy groups, and
  (c) radicals composed of carbon, hydrogen, and sulfur atoms, the sulfur atoms being present as thioether, thioester, or thiol groups;

R''' is composed of ethylene radicals and radicals selected from the group consisting of propylene and butylene radicals, the amount of ethylene radicals relative to the other alkylene radicals being such that the ratio of the carbon atoms to oxygen atoms in the total OR''' block ranges from 2.3:1 to 2.8:1;

k has an average value from 25 to 100;

A is a radical selected from the group consisting of the —OR', OOCR', and $$-\underset{\underset{O}{\|}}{O}COR'$$

radicals wherein R' is a radical free of aliphatic unsaturation selected from the group consisting of hydrocarbon and hydrocarboxy radicals, the A radical containing a total of less than eleven atoms.

This invention further relates to a method of preparing a polyether based polyurethane foam, the method including the steps of (I) preparing a homogeneous mixture as defined above, (II) thereafter allowing the mixture to foam and (III) curing the foamed composition.

DETAILED DESCRIPTION OF THE INVENTION

This invention is based on the discovery that a blend of two surfactants from diverse classes of polysiloxane-polyoxyalkylene copolymers will effectively stabilize polyurethane foam formulations based on any mixture of the reinforcing graft copolymer polyols and the non-reinforcing polyether triols. The blend of surfactants will stabilize foam formulations in which the base polyol mixture varies from essentially all polyol of the reinforcing graft copolymer type to essentially all polyol of the nonreinforcing triol type. The discovery of this blend which is useful over the entire range of polyol mixtures, greatly facilitates the preparation of customized polyurethane foam formulations. Moreover, it allows the use of more reinforcing graft copolymer type polyol in formulations so that firmer foam can be produced that has improved load bearing properties in thinner sections.

The polyether polyols that can be employed either individually or as mixtures to provide the base polyether polyol in this invention are chosen from two groups consisting essentially of the polyether triols and the graft copolymer polyols. It is preferred for the production of firmer foams that the base polyol contains at least 50 percent by weight of the graft copolymer polyol.

The polyether triols employed in this invention can be any polyether triol containing at least 40 mole percent of primary hydroxyl groups and having a molecular weight in the range of 2,000 to 8,000 grams per mole. Preferably, the polyether triols contain about 60 to 90 mole percent of primary hydroxyl groups and have a molecular weight in the range of 4,000 to 7,000 grams per mole.

Specific examples of suitable polyether triols are obtained by chemical addition of alkylene oxides to trihydroxyl organic containing materials such as glycerol, 1,2,6-hexanetriol, 1,1,1-trimethylolethane, 1,1,1-trimethylolpropane, 3-(2-hydroxyethoxy)-1,2-propanediol, 3-(2-hydroxypropoxy)-1,2-propanediol and the like, as well as mixtures thereof.

The graft copolymer polyols employed in this invention are obtained either by polymerizing ethylenically unsaturated monomers in a polyether polyol as described in U.S. Pat. No. 3,383,351, or by reacting diisocyanates with polyamines or hydrazines in polyether polyol solutions as described in U.S. Pat. No. 4,042,537. These two patents are incorporated by reference to show the composition and detailed method of preparation of the graft copolymer polyols. Suitable monomers for producing polyol compositions according to U.S. Pat. No. 3,383,351 include, for example, acrylonitrile, vinyl chloride, styrene, butadiene, vinylidene chloride, and the like. The most preferred are acrylonitrile and styrene. The graft polymer in polyether compositions can contain from about 1 to 70 percent by weight, with 5 to 50 percent by weight being further preferred and 10 to 40 percent by weight being most preferred, of the ethylenically unsaturated monomers polymerized in the polyether polyol. Such compositions are conveniently prepared by polymerizing the monomers in the selected polyether at a temperature of 40° to 150° C. in the presence of a free radical polymerization catalyst, such as peroxides, persulfates, percarbonates, perborate and azo compounds. The resulting compositions may contain some unreacted polyether, monomer, and free polymer as well as the graft polymer.

Suitable reactants for producing the graft copolymer polyols according to U.S. Pat. No. 4,042,537 include among others the polyisocyanates such as 2,4- and 2,6-toluene diisocyanates and mixtures of these isomers, polyphenyl-polymethylene polyisocyanates, and hexamethylene diisocyanate. The isocyanates are reacted with either polyamines or hydrazines to form the polymer dispersed within and grafted to the polyol solvent for the reaction. Suitable polyamines include: divalent and higher polyvalent primary or secondary, aliphatic, araliphatic, cycloaliphatic or aromatic amines. Specific examples include among others, ethylene diamine, hexamethylene diamine, 4-aminobenzylamines, 4,4'-diaminodicyclohexylmethane, phenylene diamines, toluene diamines, etc. Suitable hydrazines include hydrazine, methyl hydrazine, hydrazine hydrate, phenyl hydrazine, benzyl hydrazine and cyclohexyl hydrazine. The level of polyureas or polyhydrazodicarbonamides dispersed in the polyether polyol may vary within wide limits, although it is generally from 1 to 40 percent by weight based on 100 parts by weight of polyether polyol.

The organic polyisocyanates employed in this invention include diisocyanates such as hexamethylene diisocyanate, toluene-2,4-diisocyanate, toluene-2,6-diisocyanate and the familiar 80:20 isomeric mixtures of the 2,4- and 2,6-toluene diisocyanate, 4,4'-diphenylmethane diisocyanate, 3-methyl-4,4'-diphenylmethane diisocyanate, and m- and p-phenylene diisocyanate. Other suitable isocyanates comprise the reaction products of an excess of the diisocyanate with polyhydric alcohols such as trimethylpropanol. Other isocyanates are blends of the above isocyanates such as toluene diisocyanate and polyaromatic polyisocyanates and crude or residual polyisocyanates from the production of purer species of polyisocyanates.

Other suitable isocyanates include the reaction products of polyamines with excess isocyanates such as the reaction products of polyamines with isomer blends of 65 percent 2,4 and 35 percent 2,6 toluene diisocyanate, known as adduct isocyanates. These materials are usually liquids and are polyisocyanate functional.

The isocyanates can be employed in the present invention on a stoichiometric basis, that is, one isocyanate radical for every hydroxyl radical. The usual employment, however, is to utilize the isocyanates so as to give from 10 percent less than stoichiometric quantities of isocyanate radical to hydroxyl radical to 20 percent greater than stoichiometric quantities of isocyanate radical to hydroxyl radical in the system. Most preferred for this invention is 5 percent in excess of the isocyanate radicals over the available hydroxyl radicals.

Catalysts for the production of high resilience foams include both prior art amines and soluble organic compounds of heavy metals either singly or in various combinations. Examples of amines useful in this invention include triethylenediamine and N-ethylmorpholine, and examples of organic compounds of heavy metals are dibutyltindilaurate and stannous octoate. Mixtures of catalysts may be advantageous at times. The catalysts are usually used in the amounts ranging from 0.01 to 5.5 parts based on 100 parts of the base polyol.

The blowing agent is selected from the group consisting of water, a low-boiling organic liquid, and mixtures thereof. The low-boiling organic liquid should be chemically inert towards the isocyanates, and water, and have a boiling point less than that of water, preferably 75° C. or less. Examples of suitable low-boiling organic liquids include halogenated alkanes such as monofluorotrichloromethane and methylene chloride.

The blowing agent is used in the amount of 1 to 10 parts per 100 parts of the base polyether. When water is the sole blowing agent, it is preferred to use from 2.0 to 4.5 parts per 100 parts of base polyether. When halogenated alkanes are used in combination with water, it is preferred to use from 1 to 10 parts of the halogenated alkane in combination with 2.0 to 4.5 parts water per 100 parts of the base polyether. Mixtures of halogenated alkanes are also useful in this invention.

The final essential component is the blend of two diverse types of polysiloxane-polyoxyalkylene copolymers which acts as foam stabilizer for the composition. It is this novel blend of copolymers that provides cured foam that has fine uniform cells; is free of voids, splits, and holes; and is free from shrinkage.

The foam stabilizing blend is generally utilized in amounts ranging from 0.02 to 2.0 parts by weight per 100 parts by weight of base polyether polyol mixture. Most preferably it is used in the range of 0.1 to 1.0 parts by weight per 100 parts by weight of base polyether polyol. In certain cases, it may be advantageous to utilize the blend of polysiloxane-polyoxyalkylene copolymers in a diluted form such as for example in a solutions of a polyether triol. If a diluted form of surfactant is used, the amount of solution added should be increased proportionately to provide the appropriate amount of surfactant copolymers.

The first type of polysiloxane-polyoxyalkylene copolymer used in the blend of this invention contains a relatively short siloxane segment that contains no more than ten silicon atoms. The siloxane segment has at least one polyoxyalkylene substituent that contains an average of 1 to 15 oxyalkylene units. These polysiloxane-polyoxyalkylene copolymers are further described in U.S. Pat. No. 4,031,044 which is hereby incorporated by reference to show the preparation of these copolymers and further examples of suitable copolymers.

Specific examples of the first type of polysiloxane-polyoxyalkylene copolymers include:

$$R_a Si[(OSiMe_2)_e OSiMe_2 G]_{4-a}$$

wherein
R is a hydrocarbon radical free of aliphatic unsaturation and contains from 1 to 10 carbon atoms,
a has the value of 0 to 3,
Me is a methyl radical,
G is a radical selected from the group consisting of —D(OR")$_m$A and —L—D(OR")$_m$A wherein L is an oxygen or sulfur atom bonded to a carbon atom of the D radical, D is a divalent linking radical containing no more than eight carbon atoms and selected from the group consisting of
i. alkylene radicals,
ii. radicals composed of carbon, hydrogen and oxygen atoms, the oxygen atoms being present as ether, ester or hydroxy groups, and
iii. radicals composed of carbon, hydrogen and sulfur atoms, the sulfur atoms being present as thioether, thioester or thiol groups, R" is composed of propylene radicals and radicals selected from the group consisting of ethylene and butylene radicals wherein the amount of ethylene and butylene radicals is 0 to 35 percent by weight of the total (OR") radical, m has an average value of 1 to 15, A is a radical selected from the group consisting of —OR', OOCR', $$\underset{\underset{O}{\|}}{OCOR'}$$

radicals wherein R' is a radical free of aliphatic unsaturation selected from the group consisting of hydrocarbon and hydrocarboxy radicals, the A radical containing a total of less than eleven atoms, and when a has the value of 0 then e has the value range of 0 to 2; when a has the value of 1, then e has the value range of 0 to 3; when a has the value of 2, then e has the value range of 0 to 5; when a has the value of 3, then e has the value range of 0 to 7.

Another specific example of this type of polysiloxane-polyoxyalkylene copolymer is the copolymer having the general formula GMe$_2$Si(OSiMe$_2$)$_f$(OSiMeG)$_b$OSiMe$_2$G wherein G and Me are as defined above, and b has the value 0 to 4 with the stipulation that when b has the value of 0, then f has the value range of 0 to 7; when b has the value of 1 then f has the value range of 0 to 6; when b has the value of 2, then f has the value range of 0 to 5; when b has the value of 3, then f has the value range of 0 to 4; and when b has the value of 4, then f has the value range of 0 to 2.

Another specific example of this type of polysiloxane-polyoxyalkylene copolymer is the copolymer having the general formula R$_a$Si[(OSiMe$_2$)$_g$(OSiMeG)$_c$SOiMe$_3$]$_{4-a}$ wherein R, G, and Me are as defined above and a has the value of 0 to 3 with the stipulation that when a has the value of 0 or 1, g has the value of 0, and c has the value of 1; when a has the value of 3, g has the value of 0, and c has the value range of 1 to 5; when a has the value of 1, g has the value of 1 then c has the value of 1; when a has the value of 2, c has the value of 1 and g has the value range of 1 to 2; thus giving a molecular weight range of 221 to 2176.

Another specific example of this type of polysiloxane-polyoxyalkylene copolymers is the copolymer having the general formula Me$_3$Si(OSiMe$_2$)$_h$(OSiMeG)$_d$OSiMe$_3$ wherein Me and G is as defined above and h has the average value range of 0 to 7, d has the average value range of 1 to 5; with the stipulation that when h has the value of 0, d has the average value range of 1 to 5; when h has the value range of 1 to 2, d has the value range of 3 to 4; when h has the value range of 3 to 4; d has the value of 1 to 3; when h has the value of 5, then d has the value range of 1 to 2, and when h has the value range of 6 to 7, d has the value of 1.

The polysiloxane portion of the polysiloxane-polyoxyalkylene copolymer has the preferred molecular weight range of 221 to 1,000. The molecular weight of the glycol portion is 103 to 500 grams per mole with 150 to 350 grams per mole being preferred.

For the purpose of this invention, R in the general formulas defined above can be any hydrocarbon radical free of aliphatic unsaturation containing from 1 to 10 carbon atoms such as methyl, ethyl, hexyl, phenyl, tolyl, benzyl, xylyl, methylcyclohexyl, cyclohexyl, cyclopentyl, beta-phenylpropyl, beta-phenylethyl, decyl, and isopropyl. R' can be any hydrocarbon free of aliphatic unsaturation such as methyl, ethyl, butyl, isopropyl, cyclohexyl, phenyl, tolyl, benzyl or xenyl or any hydrocarbonoxy radicals such as —OCH(CH$_2$OMe)$_2$. Specific examples of alkylene radicals for D are the methylene, ethylene, propylene, isopropylene, butylene, and octylene radicals.

It is preferred the polyoxyalkylene substituents of this first type of polysiloxane-polyoxyalkylene copolymer have the general formula —D(OR")$_m$A wherein D is an alkylene radical, preferably propylene, A has the general formula OR', and R' is a hydrocarbon radical, preferably an alkyl radical with methyl being optimal.

It is further preferred that this polysiloxane-polyoxyalkylene copolymer, conform generally to the formula Me$_3$Si(OSiMe$_2$)$_h$(OSiMeG)$_d$OSiMe$_3$ wherein Me is a methyl radical, h has the value of 1, d has the value of 1, and G has the general formula —D(OR")$_m$A wherein D is a propylene radical, R" is a propylene radical, A is a methyl radical, and m has the value of 2.5.

The second type of polysiloxane-polyoxyalkylene copolymer used in the blend of this invention contains a longer siloxane segment that contains an average of greater than 11 silicon atoms. The siloxane segment has at least 3 polyoxyalkylene substituents that contain an average—over all the polyalkylene substituents—of 25 to 100 oxyalkylene units per substituent. This type of polysiloxane-polyoxyalkylene copolymer is further described in U.S. Pat. Nos. 4,147,847, 3,398,104, and 3,402,192 which are hereby incorporated by reference to show the preparations of these copolymers and further examples of suitable copolymers.

Specific examples of this second type of polysiloxane-polyoxyalkylene copolymer include copolymers having the general formulae:

R$_a$Si[(OSiMe$_2$)$_n$(OSiMeG)$_d$OSiMe$_2$G]$_{4-a}$;

GMe$_2$Si(OSiMe$_2$)$_n$(OSiMeG)$_b$OSiMe$_2$G;

Me₃Si(OSiMe₂)ₙ(OSiMeG)꜀OSiMe₃;

RₐSi[(OSiMe₂)ₙ(OSiMeG)꜀OSiMe₃]₄₋ₐ wherein R is a hydrocarbon radical free of aliphatic unsaturation and contains from 1 to 10 carbon atoms, Me is a methyl radical, G is a radical of the structure selected from the group consisting of —D'(OR''')ₖA and —L—D'(OR''')ₖA wherein L is an oxygen or a sulfur atom bonded to a carbon atom of the D' radical;
D' is a divalent linking radical, containing from 1 to 30 carbon atoms, selected from the group consisting of
(a) alkylene radicals,
(b) radicals composed of carbon, hydrogen, and oxygen, the oxygen atoms being present as ether, ester, or hydroxy groups, and
(c) radicals composed of carbon, hydrogen, and sulfur atoms, the sulfur atoms being present as thioether, thioester, or thiol groups;
R''' is composed of ethylene radicals and radicals selected from the group consisting of propylene and butylene radicals, the amount of ethylene radicals relative to the other alkylene radicals being such that the ratio of the carbon atoms in the total OR''' block ranges from 2.3:1 to 2.8:1;
k has an average value from 25 to 100;
A is a radical selected from the group consisting of the —OR', OOCR', and

radicals wherein R' is a radical free of aliphatic unsaturation selected from the group consisting of hydrocarbon and hydrocarboxy radicals, the A radical containing a total of less then eleven carbon atoms;
a has an average value of from 0 to 1; n has an average value of from 6 to 420; d has an average value of from 0 to 30; b has an average value of from 1 to 30; and c has an average value of from 3 to 30; said copolymers containing at least 13 percent by weight OSiMe₂ units based on the weight of the copolymer.

For the purpose of this invention, R can be any hydrocarbon radical free of aliphatic unsaturation containing from 1 to 10 carbon atoms such as methyl, ethyl, hexyl, phenyl, tolyl, benzyl, xylyl, methylcyclohexyl, cyclohexyl, cyclopentyl, beta-phenylpropyl, beta-phenylethyl, decyl, and isopropyl. R' can be any hydrocarbon free of aliphatic unsaturation such as methyl, ethyl, butyl, isopropyl, cyclohexyl, phenyl, tolyl, benzyl or xenyl or any hydrocarbonoxy radicals such as —OCH(CH₂OMe)₂. Specific examples of alkylene radicals for D' are the methylene, ethylene, propylene, isopropylene, butylene, octylene, decylene, octadecylene and myricylene radicals.

It is preferred the polyoxyalkylene substituents on the second type of polysiloxane-polyoxyalkylene copolymer have the general formula —D'(OR''')ₖA wherein D' is an alkylene radical, preferably propylene, A has the general formula OOCR' wherein R' is a hydrocarbon radical, preferably an alkyl radical with methyl being optimal.

It is further preferred that the polysiloxane-polyoxyalkylene copolymer conform generally to the formula

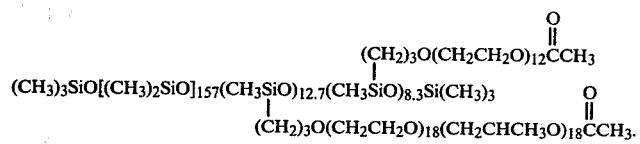

The blend of polysiloxane-polyoxyalkylene copolymers suitable for use in this invention consists essentially of 78 to 97 percent by weight of the first type of polydimethylsiloxane-polyoxyalkylene copolymer described above and 3 to 22 percent by weight of the second type of polydimethylsiloxane-polyoxyalkylene copolymer described above. It is preferred that the blend of copolymers consist essentially of 80 to 95 percent by weight of the first type of copolymer and 5 to 20 percent by weight of the second type of copolymer.

The polysiloxane-polyoxyalkylene copolymer blend can be used neat, or optionally diluted in one of the polyols that is to be utilized in the foam formulation.

The usual method of this invention is to combine ingredients (A), (C), (D), and (E) in any suitable means such as a commercial mixer or the like. The component (B) is then added, the mixture again homogenized and the foam allowed to rise in the container. The foam can then be cured at room temperature (cold cured) or at elevated temperatures (usually 107° C.) and then removed from the container for use later. In another method, the components can be metered and mixed automatically so that the separate step of adding component (B) can eliminated. Both of these methods are generally known in the art with the exception of the use of component (E) of the present invention. The above modes of mixing are not the only methods by which the foaming composition can be prepared. For instance, it is well within the scope of the instant invention to mix the ingredients in any order in which it is desirable. The only exception is that component (B) cannot be mixed with any polyol or similarly reactive component until the foaming is to begin.

The composition of this invention can contain small amounts of other ingredients normally found in polyurethane foam systems such as solvents, flame retardants and low molecular weight polysiloxane oils.

The following examples are illustrative only and should not be construed as limiting the invention.

EXAMPLE 1

The following foam formulations were evaluated for foam height efficiency:

|  | A | B | C |
|---|---|---|---|
| Niax ® A-1, grams | .1395 | .1395 | .1395 |
| Dabco ® 33LV, grams | .765 | .765 | .765 |
| Diethanolamine, grams | 1.395 | 1.395 | 1.395 |

-continued

|  | A | B | C |
|---|---|---|---|
| Distilled water, grams | 4.905 | 4.905 | 4.905 |
| Voranol ® 4701 Polyol, grams | 84 | 56 | 28 |
| Niax ® 34-28 Polyol, grams | 56 | 84 | 112 |
| Freon 11B, grams | 2.805 | 2.805 | 2.805 |
| Surfactant, grams | 1.0 | 1.0 | 1.0 |
| Tin Solution, grams | .40 | .40 | .40 |
| Toluene diisocyanate, grams | 45.0 | 45.0 | 45.0 |

The ratio of the Voranol 4701 polyol to the Niax 34-28 polyol, the graft copolymer polyol, is 60/40, 40/60, and 20/80 for formulations A, B, and C, respectively.

The preparation of the foams consisted of milling on a jar mill for two to three minutes the Niax ® A-1 [an amine catalyst manufactured by the Union Carbide Corporation, Danbury, Conn. 06817 consisting of 70 weight percent bis(2-dimethylaminoethyl) ether and 30 weight percent dipropylene glycol], Dabco ® 33LV (a tertiary amine manufactured by Air Products, Allentown, Penn. 18105 consisting of 33.3 percent by weight of triethylenediamine and 66.7 percent by weight of dipropylene glycol), diethanolamine, and the distilled water.

The Voranol ® 4701 Polyol (a 4500 molecular weight propylene glycol based polyether triol with primary hydroxy end capping manufactured by Dow Chemical Company, Midland, Mich. 48640), Niax ® 34-28 Polyol (a 5000 molecular weight styrene-acrylonitrile graft copolymer polyol manufactured by Union Carbide Corporation, Danbury, Conn. 06817), and the Freon 11B (trichloromonofluoromethane manufactured by E. I. DuPont, DeNemours & Co., Inc., Wilmington, Del. 19898) was then added to the amine and water mixture. This premix was then rolled on the mill for 15 minutes, shaken, and milled for an additional 20 minutes.

The premix was then allowed to sit in a constant temperature bath at 70° F. for a minimum of 60 minutes until all the air bubbles were removed. The surfactant was then added. The surfactants evaluated were:

1. a solution of about 20 percent by weight of a polysiloxane conforming generally to the formula

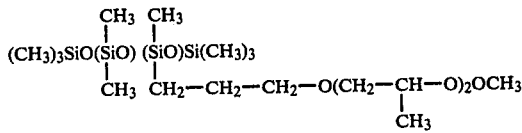

in about 80 percent by weight of Voranol ® 4701;

2. a cold blend of 98 percent by weight of the surfactant solution as defined above and 2 percent by weight of a polysiloxane conforming generally to the formula 3. Union Carbide L-5307 surfactant for high resiliency foams, the surfactant being a silicone glycol; and 4. a trimethylsiloxy endblocked polyophenylmethylsiloxane.

The indicated amount of tin solution was then added. The tin solution employed in the preparation of the foams is 10 percent by weight of dibutyltin dilaurate and 90 percent by weight Voranol 4701 ®.

The premix, surfactant and tin solution were then mixed for 20 seconds at 1250 rpm on a foam mixer. The indicated amount of toluene diisocyanate was added and the mixture was mixed for 4.5 seconds at 1750 rpm on a foam mixer.

Into an 83 oz., 16 centimeter wide bucket, 160 grams of the mixture was poured. The sample was allowed to foam until there were small breaks in its continuity. The foam height was then measured. The mixture was allowed to foam for 6 minutes and the height was again measured. The mixture was further allowed to foam for 24 hours and the final height was measured. The percent settling was calculated as the percent difference between the initial height and the final height. The results are as follows:

| Formulation | Surfactant | Initial Height, Inches | Height at 6 minutes, Inches | Final Height, Inches | % Settling |
|---|---|---|---|---|---|
| A | 1 | 8 4/16 | 7 4/16 | 7 6/16 | 10.6 |
| B | 1 | 8 4/16 | 7 2/16 | 7 0/16 | 15.2 |
| C | 1 | 8 3/16 | 6 11/16 | 6 8/16 | 20.6 |
| A | 2 | 8 8/16 | 8 5/16 | 7 14/16 | 7.4 |
| B | 2 | 8 8/16 | 8 4/16 | 8 0/16 | 5.9 |
| C | 2 | 8 7/16 | 8 0/16 | 7 12/16 | 8.1 |
| A | 3 | 8 5/16 | 10/16 | 7 8/16 | 9.77 |
| B | 3 | 8 4/16 | 7 2/16 | 7 0/16 | 15.2 |
| C | 3 | 8 4/16 | 6 10/16 | 6 8/16 | 21.2 |
| A | 4 | 8 4/16 | 7 10/16 | 7 7/16 | 9.8 |
| B | 4 | 8 4/16 | 7 2/16 | 7 0/16 | 15.2 |
| C | 4 | 8 4/16 | 7 0/16 | 6 2/16 | 18.2 |

As the level of graft copolymer polyol is increased from 40 to 80 parts by weight, foam settle back becomes more severe with standard surfactants for high resiliency foams, 1,3 and 4 in the example. The surfactant of the present invention, 2 in the example, however, maintains foam height with minimum settle back.

EXAMPLE 2

The following foam formulations were prepared as in Example 1 to examine densities to determine the relative stabilizing properties of surfactants in foams containing high levels of graft copolymer polyols. Instead of foaming at room temperature, the foams were placed in a 200° F. oven for 15 minutes prior to evaluation. All the components are stated in parts by weight unless otherwise indicated.

The surfactants employed in the following foam formulations are:

5. a cold blend of 96 percent by weight of surfactant

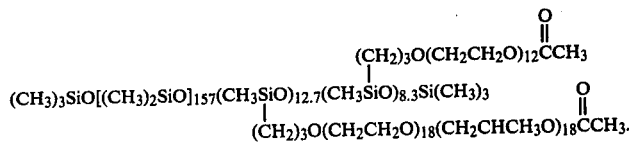

solution number 1 employed in Example 1 and 4 percent by weight of a polysiloxane conforming generally to the formula

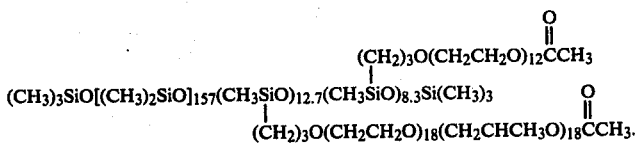

6. Surfactant 2 as defined in Example 1;
7. Surfactant 3 as defined in Example 1;
8. Surfactant solution 1 as defined in Example 1; and
9. Union Carbide L-5309 Surfactant, a silicone glycol, used in high resiliency foams.

The foam formulations are as follows:

| | D | E | F |
|---|---|---|---|
| Niax ® A-107 | .12 | .12 | .12 |
| Dabco ® 33LV | .33 | .33 | .33 |
| Thancat ® DM-70 | .3 | .3 | .3 |
| Distilled water | 3.5 | 3.5 | 3.5 |
| Voranol ® 4701 Polyol | 60 | 40 | 20 |
| Pluracol ® 920 | 40 | 60 | 80 |
| Surfactant | 1.8 | 1.8 | 1.8 |
| Foamrez ® UL.1 | .01 | .01 | .01 |
| 80 TDI/20 MDI | 100 index | 100 index | 100 index |

| | G | H | I |
|---|---|---|---|
| Niax ® A-107 | .2 | .2 | .2 |
| Dabco ® 33LV | .5 | .5 | .5 |
| Distilled water | 4.0 | 4.0 | 4.0 |
| Multranol ® 3901 | 60 | 40 | 20 |
| Multranol ® 9151 | 40 | 60 | 80 |
| Surfactant | 1.8 | 1.8 | 1.8 |
| Foamrez ® UL.1 | .01 | .01 | .01 |
| Multranol ® E .531 | 100 index | 100 index | 100 index |

Niax ® A-107 is an amine catalyst manufactured by Union Carbide Corporation, Danbury, Conn. 06817.
Thancat ® DM-70 is an amine catalyst manufactured by Texaco Chemical Company, Bellaire, Tex. 77401.
Pluracol ® 920 is a styrene-acrylonitrile graft copolymer polyol manufactured by BASF Wyandotte Corporation, Parsippany, N.J. 07054.
Foamrez ® UL.1 is an organo tin compound manufactured by Witco Chemical, New York, N.Y. 10017.
TDI is an abbreviation for toluene diisocyanate and MDI is an abbreviation for diphenylmethane diisocyanate.
Multranol ® 3901 is a 6000 molecular weight polyether triol modified with ethylene oxide end capping and manufactured by Mobay Chemical Corporation, Pittsburg, Penn.
Multranol ® 9151 is a polyurea graft copolymer polyol manufactured by Mobay Chemical Corporation, Pittsburg, Penn.
Multranol ® E .531 is a toluene diisocyanate/diphenylmethane diisocyanate blend manufactured by Mobay Chemical Corporation, Pittsburg, Penn.

The densities of the foams were measured by weighing a small sample in grams, dividing the weight by the sample size in cubic inches and multiplying the total by a factor of 3.806.

The results are as follows:

| Formulation | Surfactant | Density, lb/ft$^3$ |
|---|---|---|
| D | 5 | 1.80 |
| | 6 | 1.86 |
| | 7 | 1.88 |
| | 8 | 1.9 |
| | 9 | 2.0 |
| E | 5 | 1.80 |
| | 6 | 1.90 |
| | 7 | 1.99 |
| | 8 | 1.99 |
| | 9 | 2.1 |
| F | 5 | 1.80 |
| | 6 | 1.95 |
| | 7 | 2.06 |
| | 8 | 2.09 |
| | 9 | 2.24 |
| C | 5 | 1.6 |
| | 6 | 1.66 |
| | 7 | 1.71 |

-continued

| Formulation | Surfactant | Density, lb/ft$^3$ |
|---|---|---|
| | 8 | 1.72 |
| | 9 | 1.79 |
| H | 5 | 1.6 |
| | 6 | 1.71 |
| | 7 | 1.79 |
| | 8 | 1.8 |
| | 9 | 1.85 |
| I | 5 | 1.7 |
| | 6 | 1.81 |
| | 7 | 1.84 |
| | 8 | 1.85 |
| | 9 | 2.05 |

The data shows that as the level of graft copolymer polyol is increased in the formulations, the densities of the foams made with the surfactants of the present invention, surfactants 5 and 6, average 8 to 12 percent lower than the densities of the foam made with currently available surfactants.

That which is claimed is:
1. A composition consisting essentially of
(A) 100 parts by weight of a base polyether polyol selected from the group consisting of
  1. a polyether triol containing at least 40 mole percent of primary hydroxyl groups and having a molecular weight in the range of 2,000 to 8,000 grams per mole.
  2. a graft copolymer polyol, and
  3. mixtures thereof;
(B) a sufficient amount of organic polyisocyanate to give from 90 to 120 percent, on a stoichiometric basis, of isocyanate radicals for each hydroxyl radical in the composition;
(C) a catalytic amount of a catalyst for the production of the polyurethane foam;
(D) 1 to 10 parts by weight of a blowing agent;
(E) a foam stabilizing amount of a blend of polysiloxane-polyoxyalkylene copolymers consisting essentially of
  1. 78 to 97 percent by a weight of a polydimethylsiloxane-polyoxyalkylene copolymer wherein the polysiloxane contains no more than ten silicon atoms and the polysiloxane has at least one polyoxyalkylene substituent having the general formula selected from the group consisting of —D(OR")$_m$A and —L—D(OR")$_m$A wherein L is an oxygen or a sulfur atom bonded to a carbon atom of the D radical;
D is a divalent linking radical, containing no more than 8 carbon atoms, selected from the group consisting of
  (a) alkylene radicals,
  (b) radicals composed of carbon, hydrogen, and oxygen, the oxygen atoms being present as ether, ester, or hydroxy groups, and (c) radicals composed of carbon, hydrogen, and sulfur atoms, the sulfur atoms being present as thioether, thioester, or thiol groups;

R" is composed of propylene radicals and radicals selected from the group consisting of ethylene and butylene radicals wherein the amount of ethylene and butylene radicals is 0 to 35 weight percent of the total (OR") radical;

m has an average value of 1 to 15;

A is a radical selected from the group consisting of the —OR', OOCR', and

—OCOR'
‖
O radicals wherein R' is a radical free of aliphatic unsaturation selected from the group consisting of hydrocarbons and hydrocarboxy radicals, the A radical containing a total of less than eleven carbon atoms; and 2. 3 to 22 percent by weight of a polydimethylsiloxane-polyoxyalkylene copolymer, said copolymer containing at least 13 percent by weight of dimethylsiloxane units based on the weight of the copolymer, wherein the polysiloxane has at least three polyoxyalkylene substituents having the general formula —D'(OR''')$_k$A and —L—D'(OR''')$_k$A wherein L is an oxygen or sulfur atom bonded to a carbon atoms of the D' radical;

D' is a divalent linking radical containing from 1 to 30 carbon atoms selected from the group consisting of
(a) alkylene radicals,
(b) radicals composed of carbon, hydrogen, and oxygen atoms, the oxygen atoms being present as ether, ester, or hydroxy group, and
(c) radicals composed of carbon, hydrogen, and sulfur atoms, the sulfur atoms being present as thioether, thioester, or thiol groups;

R''' is composed of ethylene radicals and radicals selected from the group consisting of propylene and butylene radicals, the amount of ethylene radicals relative to the other alkylene radicals being such that the ratio of the carbon atoms to oxygen atoms in the total OR''' block ranges from 2.3:1 to 2.8:1;

k has an average value from 25 to 100;

A is a radical selected from the group consisting of the —OR', OOCR', and

—OCOR'
‖
O radicals wherein R' is a radical free of aliphatic unsaturation selected from the group consisting of hydrocarbon and hydrocarboxy radicals, the A radical containing a total of less than eleven atoms.

2. The composition as defined in claim 1 wherein the base polyether polyol, A, is composed of at least 40 percent by weight of graft copolymer polyol that contains 10 to 40 weight percent of polyurea or polyhydrazodicarbonamide dispersed in polyether polyol.

3. The composition as defined in claim 1 wherein the graft copolymer polyol contains 1 to 70 weight percent of a copolymer of acrylonitrile and styrene; the polyoxyalkylene substituents on the polydimethylsiloxane-polyoxyalkylene copolymer component, E1, has the general formula —D(OR")$_m$A wherein D is an alkylene radical, A has the general formula OR', and R' is a hydrocarbon radical; the polyoxyalkylene substituent on the polydimethylsiloxane-polyoxyalkylene component, E2, has the general formula —D'(OR''')$_k$A wherein D' is an alkylene radical, A has the general formula OOCR', and R' is a hydrocarbon radical.

4. The composition as defined in claim 3 wherein the base polyether polyol, A, is composed of at least 40 percent by weight of graft copolymer polyol containing 10 to 40 weight percent of a copolymer of acrylonitrile and styrene; the polyether triol component, contains 60 to 90 mole percent of primary hydroxyl groups and has a molecular weight range of 4,000 to 7,000 grams per mole; and in the polydimethylsiloxane-polyoxyalkylene components of blend (E), D and D' are propylene and R' is methyl.

5. The composition as defined in claim 4 wherein the polysiloxane-polyoxyalkylene copolymer blend, E, is composed of 78 to 97 percent by weight of a copolymer conforming generally to the average composition (CH$_3$)$_3$SiO[(CH$_3$)$_2$SiO](CH$_3$SiO)Si(CH$_3$)$_3$
|
(CH$_2$)$_3$O(C$_3$H$_6$O)$_{2.5}$CH$_3$ and 3 to 22 percent by weight of a copolymer conforming generally to the average formula

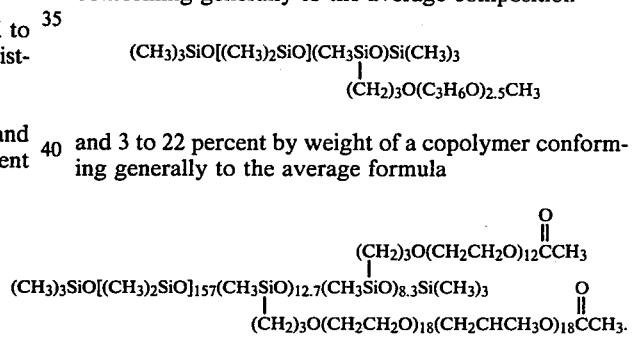

6. A method of preparing a polyether based polyurethane foam, which method includes the steps of
1. preparing a homogeneous mixture consisting essentially of
(A) 100 parts by weight of a base polyether polyol selected from the group consisting of
1. a polyether triol containing at least 40 mole percent of primary hydroxyl groups and having a molecular weight in the range of 2,000 to 8,000 grams per mole,
2. a graft copolymer polyol, and
3. mixtures thereof;
(B) a sufficient amount of organic polyisocyanate to give from 90 to 120 percent, on a stoichiometric basis, of isocyanate radicals for each hydroxyl radical in the composition;
(C) a catalytic amount of a catalyst for the production of the polyurethane foam;

(D) 1 to 10 parts by weight of a blowing agent;
(E) a foam stabilizing amount of a blend of polysiloxane-polyoxyalkylene copolymers consisting essentially of
1. 78 to 97 percent by weight of a polydimethylsiloxane-polyoxyalkylene copolymer wherein the polysiloxane contains no more than ten silicon atoms and the polysiloxane has at least one polyoxyalkylene substituent having the general formula selected from the group consisting of —D(OR")$_m$A and —L—D(OR")$_m$A wherein L is an oxygen or a sulfur atom bonded to a carbon atom of the D radical;
D is a divalent linking radical, containing no more than 8 carbon atoms, selected from the group consisting of
(a) alkylene radicals,
(b) radicals composed of carbon, hydrogen, and oxygen, the oxygen atoms being present as ether, ester, or hydroxy groups, and
(c) radicals composed of carbon, hydrogen, and sulfur atoms, the sulfur atoms being present as thioether, thioester, or thiol groups;
R" is composed of propylene radicals and radicals selected from the group consisting of ethylene and butylene radicals wherein the amount of ethylene and butylene radicals is 0 to 35 weight percent of the total (OR") radical;
m has an average value of 1 to 15;
A is a radical selected from the group consisting of the —OR', OOCR', and $$-\underset{\underset{O}{\|}}{O}COR'$$

radicals wherein R' is a radical free of aliphatic unsaturation selected from the group consisting of hydrocarbons and hydrocarboxy radicals, the A radical containing a total of less than eleven carbon atoms; and
2. 3 to 22 percent by weight of a polydimethylsiloxane-polyoxyalkylene copolymer, said copolymer containing at least 13 percent by weight of dimethylsiloxane units based on the weight of the copolymer, wherein the polysiloxane has at least three polyoxyalkylene substituents having the general formula —D'(OR''')$_k$A and —L—D'(OR''')$_k$A wherein L is an oxygen or sulfur atom bonded to a carbon atoms of the D' radical;
D' is a divalent linking radical containing from 1 to 30 carbon atoms selected from the group consisting of
(a) alkylene radicals,
(b) radicals composed of carbon, hydrogen, and oxygen, the oxygen atoms being present as ether, ester, or hydroxy groups, and
(c) radicals composed of carbon, hydrogen, and sulfur atoms, the sulfur atoms being present as thioether, thioester, or thiol groups;
R''' is composed of ethylene radicals and radicals selected from the group consisting of propylene and butylene radicals, the amount of ethylene radicals relative to the other alkylene radicals being such that the ratio of the carbon atoms to oxygen atoms in the total OR''' block ranges from 2.3:1 to 2.8:1;
k has an average value from 25 to 100;
A is a radical selected from the group consisting of the —OR', OOCR', and $$-\underset{\underset{O}{\|}}{O}COR'$$

radicals wherein R' is a radical free of aliphatic unsaturation selected from the group consisting of hydrocarbon and hydrocarboxy radicals, the A radical containing a total of less than eleven atoms,
II. thereafter allowing the mixture to foam, and
III. curing the foamed composition.

7. The process as defined in claim 6 wherein the base polyether polyol, A, is composed of at least 40 percent by weight of graft copolymer polyol that contains 10 to 40 weight percent of polyurea or polyhydrazodicarbonamide dispersed in polyether polyol.

8. The process as defined in claim 6 wherein the graft copolymer polyol contains 1 to 70 weight percent of a copolymer of acrylonitrile and styrene; the polyoxyalkylene substituents on the polydimethylsiloxane-polyoxyalkylene copolymer component, E1, have the general formula —D(OR")$_m$A wherein D is an alkylene radical, A has the general formula OR', and R' is a hydrocarbon radical; the polyoxyalkylene substituent on the polydimethylsiloxane-polyoxyalkylene component, E2, has the general formula —D'(OR''')$_k$A wherein D' is an alkylene radical, A has the general formula OOCR', and R' is a hydrocarbon radical.

9. The process as defined in claim 8 wherein the base polyether polyol, A, is composed of at least 40 percent by weight of graft copolymer polyol containing 10 to 40 weight percent of a copolymer of acrylonitrile and styrene; the polyether triol component, contains 60 to 90 mole percent of primary hydroxyl groups and has a molecular weight range of 4,000 to 7,000 grams per mole; and in the polydimethylsiloxane-polyoxyalkylene components of blend (E), D and D' are propylene and R' is methyl.

10. The process as defined in claim 9 wherein the polysiloxane-polyoxyalkylene copolymer blend, E, is composed of 78 to 97 percent by weight of a copolymer conforming generally to the average formula (CH$_3$)$_3$SiO[(CH$_3$)$_2$SiO](CH$_3$SiO)Si(CH$_3$)$_3$
                                             |
                                      (CH$_2$)$_3$O(C$_3$H$_6$O)$_{2.5}$CH$_3$ and 3 to 22 percent by weight of a copolymer conforming generally to the average formula

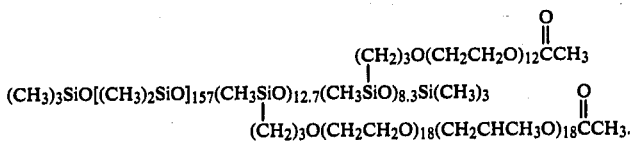

11. A composition comprising a blend of polysiloxane-polyoxyalkylene copoylmers wherein the blend consists essentially of 1. 78 to 97 percent by weight of a polydimethylsiloxane-polyoxyalkylene copolymer wherein the polysiloxane contains no more than ten silicon atoms and the polysiloxane has at least one polyoxyalkylene substituent having the general formula selected from the group consisting of —D(OR″)$_m$A and —L—D(OR″)$_m$A wherein L is an oxygen or a sulfur atom bonded to a carbon atom of the D radical;
D is a divalent linking radical, containing no more than 8 carbon atoms, selected from the group consisting of
(a) alkylene radicals,
(b) radicals composed of carbon, hydrogen, and oxygen, the oxygen atoms being present as ether, ester, or hydroxy groups, and
(c) radicals composed of carbon, hydrogen, and sulfur atoms, the sulfur atoms being present as thioether, thioester, or thiol groups;
R″ is composed of propylene radicals and radicals selected from the group consisting of ethylene and butylene radicals wherein the amount of ethylene and butylene radicals is 0 to 35 weight percent of the total (OR″) radical;
m has an average value of 1 to 15;
A is a radical selected from the group consisting of the —OR′, OOCR′, and

—OCOR′
‖
O radicals wherein R′ is a radical free of aliphatic unsaturation selected from the group consisting of hydrocarbons and hydrocarboxy radicals, the A radical containing a total of less than eleven carbon atoms and 2. 3 to 22 percent by weight of a polydimethylsiloxane-polyoxyalkylene copolymer, said copolymer containing at least 13 percent by weight of dimethylsiloxane units based on the weight of the copolymer, wherein the polysiloxane has at least three polyoxyalkylene substituents having the general formula —D′(OR‴)$_k$A and —L—D′(OR‴)$_k$A wherein L is an oxygen or sulfur atom bonded to a carbon atoms of the D′ radical;
D′ is a divalent linking radical containing from 1 to 30 carbon atoms selected from the group consisting of
(a) alkylene radicals,
(b) radicals composed of carbon, hydrogen, and oxygen atoms, the oxygen atoms being present as ether, ester, or hydroxy groups, and
(c) radicals composed of carbon, hydrogen, and sulfur atoms, the sulfur atoms being present as thioether, thioester, or thiol groups;
R‴ is composed of ethylene radicals and radicals selected from the group consisting of propylene and butylene radicals, the amount of ethylene radicals relative to the other alkylene radicals being such that the ratio of the carbon atoms to oxygen atoms in the total OR‴ block ranges from 2.3:1 to 2.8:1;
k has an average value from 25 to 100;
A is a radical selected from the group consisting of the —OR′, OOCR′, and

—OCOR′
‖
O radicals wherein R′ is a radical free of aliphatic unsaturation selected from the group consisting of hydrocarbon and hydrocarboxy radicals, the A radical containing a total of less than eleven atoms.

12. The composition as defined in claim 11 wherein the polyoxyalkylene substituents on the polydimethylsiloxane-polyoxyalkylene copolymer component 1 has the general formula —D(OR″)$_m$A wherein D is an alkylene radical, A has the general formula OR′, and R′ is a hydrocarbon radical and the polyoxyalkylene substituent on the polydimethylsiloxane-polyoxyalkylene component 2 has the general formula —D′(OR‴)$_k$A wherein D′ is an alkylene radical, A has the general formula OOCR′, and R′ is a hydrocarbon radical.

13. The composition as defined in claim 12 wherein D and D′ are propylene and R′ is methyl.

14. The composition as defined in claim 13 wherein the blend is composed of 78 to 97 percent by weight of a copolymer conforming generally to the average composition (CH$_3$)$_3$SiO[(CH$_3$)$_2$SiO](CH$_3$SiO)Si(CH$_3$)$_3$
|
(CH$_2$)$_3$O(C$_3$H$_6$O)$_{2.5}$CH$_3$ and 3 to 22 percent by weight of a copolymer conforming generally to the average formula

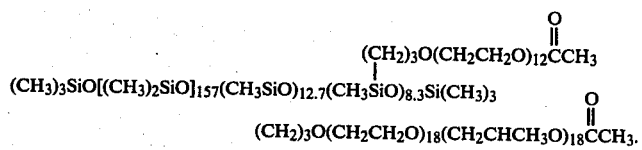
* * * * *

UNITED STATES PATENT AND TRADEMARK OFFICE
CERTIFICATE OF CORRECTION

PATENT NO. : 4,477,601
DATED : October 16, 1984
INVENTOR(S) : David R. Battice

It is certified that error appears in the above-identified patent and that said Letters Patent is hereby corrected as shown below:

In column 3, line 48, "atoms" should read -- atom --.

In column 6, line 43, "solutions" should read -- solution --.

In column 7, line 58, "$R_a Si[(OSiMe_2)_g (OSiMeG)_c SOiMe_3]_{4-a}$"

should read -- $R_a Si[(OSiMe_2)_g (OSiMeG)_c OSiMe_3]_{4-a}$ --.

In column 9, line 1, "$Me_3 Sl(OSiMe_2)_n (OSiMeG)_c OSiMe_3$"
should read -- $MeSi(OSiMe_2)_n (OSiMeG)_c OSiMe_3$ --.

In column 10, line 44, "can eliminated" should read
-- can be eliminated --.

In column 12, line 1, "polyophenylmethylsiloxane" should read
-- polyphenylmethylsiloxane --.

UNITED STATES PATENT AND TRADEMARK OFFICE
CERTIFICATE OF CORRECTION

PATENT NO. : 4,477,601
DATED : October 16, 1984
INVENTOR(S) : David R. Battice

It is certified that error appears in the above-identified patent and that said Letters Patent is hereby corrected as shown below:

In column 12, line 26, (Table, columns 3 and 4)
   "7 4/16   7 6/16" should read -- 7 6/16   7 4/16 --.

In column 12, line 31, (Table, Column 3)
   "10/16" should read -- 7 10/16 --.

In column 13, line 67 "C" should read -- G --.

*Signed and Sealed this*

*Sixteenth* Day of *July 1985*

[SEAL]

*Attest:*

DONALD J. QUIGG

*Attesting Officer*   *Acting Commissioner of Patents and Trademarks*